UNITED STATES PATENT OFFICE.

JULIUS HOFMEIER, OF VIENNA, AUSTRIA-HUNGARY.

PROCESS OF MAKING AN ADHESIVE FROM BLOOD FIBRIN.

SPECIFICATION forming part of Letters Patent No. 682,326, dated September 10, 1901.

Application filed September 4, 1900. Serial No. 28,912. (No specimens.)

*To all whom it may concern:*

Be it known that I, JULIUS HOFMEIER, residing in Vienna, Austria-Hungary, have invented certain new and useful Improvements in Processes of Manufacturing a Preparation from Blood Fibrin, of which the following is a specification.

This invention relates to a process for obtaining a preparation from blood fibrin suitable for gluing and similar purposes.

For carrying out my invention I mix blood fibrin with an equal quantity, by weight, of a solution of a caustic alkali, preferably of one to two per cent. of sodium hydroxid or its equivalent, and let the mixture stand for twenty-four hours. I then heat the mixture on a water-bath while stirring it up until a perfect solution is obtained, which after filtration is evaporated to dryness. I take up the residue in about five parts of warm water, and on adding to the cool solution a soluble chromic or bichromic salt in the proportion of two to one hundred of the preparation I obtain a product which, similar to a solution of glue, is suitable for fixing coloring-matter on paper and other material and for impregnating and like purposes, it becoming insoluble on drying and exposing the dried surface to light. In place of a chromate I may use ferricyanid of potassium or some other soluble ferricyanid in the proportion of fifteen to one hundred of the preparation or I may mix the preparation with chromic alum or acetate of aluminium in the same proportion, fifteen to one hundred. If ferricyanid of potassium or acetate of aluminium be employed, exposure to light may be dispensed with. Similarly I may use six per cent. of hexamethyleneamin or equimolecular weights of bisulfite of formic aldehyde and sodium, respectively, or any other known coagulating agent for rendering a solution of the aforementioned preparation capable of becoming insoluble on drying. The proportion of the coagulating agent to be added to the described preparation may of course be varied without departing from the nature of my invention.

What I claim as my invention, and desire to secure by Letters Patent, is—

A process of obtaining a preparation for gluing and similar purposes consisting in evaporating to dryness an alkaline solution of blood fibrin, dissolving the residue and treating the solution obtained with a coagulating agent or agents substantially as hereinbefore described.

In witness whereof I have hereunto signed my name, this 17th day of August, 1900, in the presence of two subscribing witnesses.

JULIUS HOFMEIER.

Witnesses:
ALVESTO S. HOGUE,
JOHN F. ANDERSON.